(12) United States Patent
O'Connell et al.

(10) Patent No.: US 7,673,384 B2
(45) Date of Patent: Mar. 9, 2010

(54) NUT RUNNER AND HEXABOT ROBOT

(75) Inventors: Terry O'Connell, Davenport, IA (US); Jack Fisher, Liberty Township, OH (US); Arthur E. Smith, Jr., Sterling Heights, MI (US); Satoshi Sato, Mitaka (JP)

(73) Assignee: Genesis Systems Group, LLC, Davenport, IA (US)

( * ) Notice: Subject to any disclaimer, the term of this patent is extended or adjusted under 35 U.S.C. 154(b) by 671 days.

(21) Appl. No.: 11/380,601

(22) Filed: Apr. 27, 2006

(65) Prior Publication Data

US 2007/0253799 A1 Nov. 1, 2007

(51) Int. Cl.
*B23P 21/00* (2006.01)
*B66C 3/00* (2006.01)
(52) U.S. Cl. .................... 29/787; 29/795; 414/735
(58) Field of Classification Search ............ 29/787, 29/795, 771, 791, 711, 822, 430; 901/28, 901/14, 41; 414/735
See application file for complete search history.

(56) References Cited

U.S. PATENT DOCUMENTS

| | | | | |
|---|---|---|---|---|
| 3,451,224 A | * | 6/1969 | Colechia et al. ............. 405/190 |
| 3,627,081 A | * | 12/1971 | Santos ........................ 187/305 |
| 4,431,366 A | * | 2/1984 | Inaba et al. ................. 414/735 |
| 4,493,598 A | * | 1/1985 | Glachet et al. ................. 414/1 |
| 4,502,830 A | * | 3/1985 | Inaba et al. ................. 414/735 |
| 4,658,501 A | * | 4/1987 | Fujii et al. .................... 29/787 |
| 4,693,663 A | * | 9/1987 | Brenholt et al. ............. 414/735 |
| 4,739,241 A | * | 4/1988 | Vachtsevanos et al. . 318/568.19 |
| 4,787,262 A | * | 11/1988 | Kozawa et al. ........... 74/490.06 |
| 4,790,718 A | * | 12/1988 | Vickers ...................... 414/735 |
| 4,819,496 A | * | 4/1989 | Shelef ..................... 74/490.03 |
| 4,822,238 A | * | 4/1989 | Kwech ....................... 414/730 |
| 5,014,405 A | * | 5/1991 | Yamana et al. .............. 29/33 R |
| 5,150,506 A | * | 9/1992 | Kotake et al. ............ 29/407.05 |
| 5,155,423 A | * | 10/1992 | Karlen et al. .......... 318/568.11 |
| 5,186,595 A | * | 2/1993 | Ohtsu et al. ............. 414/226.05 |
| 5,203,073 A | * | 4/1993 | Kotake et al. ................. 29/784 |
| 5,205,701 A | * | 4/1993 | Kigami et al. ............ 414/744.5 |
| 5,207,554 A | * | 5/1993 | Asakawa et al. ......... 414/744.6 |
| 5,210,931 A | * | 5/1993 | Ozawa et al. ................. 29/712 |
| 5,283,937 A | * | 2/1994 | Uesugi ...................... 29/281.5 |
| 5,388,935 A | * | 2/1995 | Sheldon ...................... 409/201 |
| 5,497,674 A | * | 3/1996 | Inada ....................... 74/490.03 |
| 5,540,541 A | * | 7/1996 | Gosdowski et al. ...... 414/744.5 |
| 5,584,646 A | * | 12/1996 | Lewis et al. ................. 414/738 |
| 5,640,750 A | * | 6/1997 | Yoshida et al. ........... 29/525.02 |
| 5,784,542 A | * | 7/1998 | Ohm et al. ................... 700/260 |
| 5,813,287 A | * | 9/1998 | McMurtry et al. ....... 74/490.06 |
| 5,816,736 A | * | 10/1998 | Kroulik ...................... 403/389 |
| 5,828,813 A | * | 10/1998 | Ohm .......................... 700/260 |
| 5,987,726 A | * | 11/1999 | Akeel ...................... 29/407.08 |
| 5,993,364 A | * | 11/1999 | Matsuura et al. .............. 483/16 |

(Continued)

*Primary Examiner*—David P Bryant
*Assistant Examiner*—Ryan J Walters
(74) *Attorney, Agent, or Firm*—McKee, Voorhees & Sease, P.L.C.

(57) ABSTRACT

A six degree of freedom servo driven robot having a seventh axis servo motor for rotating servo driven nut runners affixed to swing arms about a radius. The robot offering flexibility within high production manufacturing and automotive assembly processes by realizing translational movement of servo driven nut runners about seven degrees of translation for fastening component parts of a work product within a work envelope.

19 Claims, 7 Drawing Sheets

U.S. PATENT DOCUMENTS

| | | | | |
|---|---|---|---|---|
| 6,138,342 A * | 10/2000 | Kuze | ............ | 29/564.1 |
| 6,222,338 B1 * | 4/2001 | Villaret | ............ | 318/568.13 |
| 6,302,310 B1 * | 10/2001 | Lamb | ............ | 227/119 |
| 6,477,912 B2 * | 11/2002 | Song et al. | ............ | 74/490.06 |
| 6,481,083 B1 * | 11/2002 | Lawson et al. | ............ | 29/407.04 |
| 6,705,177 B2 * | 3/2004 | Okuno et al. | ............ | 74/490.01 |
| 6,791,291 B2 * | 9/2004 | Shimizu et al. | ............ | 318/568.1 |
| 6,886,231 B2 * | 5/2005 | Lawson et al. | ............ | 29/407.01 |
| 6,933,695 B2 * | 8/2005 | Blumenkranz | ............ | 318/568.11 |
| 7,011,489 B2 * | 3/2006 | Brogardh et al. | ............ | 414/735 |
| 7,089,667 B2 * | 8/2006 | McAdoo | ............ | 29/897.31 |
| 7,090,458 B2 * | 8/2006 | Huang et al. | ............ | 414/735 |
| 7,096,983 B2 * | 8/2006 | Hirai et al. | ............ | 180/8.1 |
| 7,322,089 B2 * | 1/2008 | Giacona et al. | ............ | 29/407.04 |
| 7,325,297 B2 * | 2/2008 | Xia | ............ | 29/724 |
| 7,367,245 B2 * | 5/2008 | Okazaki et al. | ............ | 74/490.04 |

* cited by examiner

NUT RUNNER AND HEXABOT ROBOT

BACKGROUND OF THE INVENTION

Varieties of high production manufacturing and automotive assembly processes, particularly automotive industry fastening applications, currently use a fixed mount gang-head configuration or group mounting of nut runners to assemble component parts. These systems lack flexibility as robots are only able to adjust the position of the nut runners in the fixed position gang configuration collectively, but not individually. Because the nut runners within the gang head are fixed and often spaced closely to each other, these systems typically are limited to servicing one model style and do not adjust quickly or easily to variations in the fastening locations for the component parts. In addition, the limited spacing between the nut runners nearly precludes these systems from allowing individual nut runners within the configuration to compensate for pitch changes required to service various models and fastening locations. Using a fixed position gang head configuration of nut runners ultimately limits the systems versatility by requiring more changeover thereby increasing retooling and build costs for the assembled parts.

What is needed is a flexible fastening system capable of automatically adjusting to changing needs within automotive and manufacturing fastening applications. Further, a six degree of freedom servo-driven parallel link robot with a seventh axis servo motor drives a gear box having arms rotatable about the seventh axis to vary the pitch of the nut runners for fastening component parts. The robot's flexibility allows for quick adaption to changes in model styles and fastening locations.

BRIEF SUMMARY OF THE INVENTION

The robot of the present invention is associated with a frame and provides for fastening component parts within manufacturing and automotive assembly processes. The robot includes a plurality of arms having a first end and a second end such that the first end is operatively supported by the frame. An actuator is mounted between the first and the second end for varying the length of the arms. A wrist having a top side, a bottom side and an aperture centered thereon such that the top side of the wrist further comprises a plurality of paired connection points. A pair of the second ends of the plurality of arms are operatively secured to each of the connection points on the top side of the wrist such that varying the length of the arms provides movement of the wrist about six axes of translation. A servo motor is mounted on the top of the wrist and in driving communication downward through the aperture in the wrist. A gear box is mounted on the bottom side of the wrist and secured to the servo motor through the aperture in the wrist. The servo motor is adapted for driving the gear box. A pair of swing arms have a first end and a second end, the first end is attached to the gear box. A nut runner is operatively attached to the second end of the swing arms, the servo motor is driving the gear box thereby moving the swing arms and the attached nut runners about a radius. The rotation of the swing arms about the radius and varying the length of the arms provides movement of the nut runners about a seventh axis of translation.

According to another feature of the present invention, the gear box further comprises a harmonic drive having a pair of spur gears. The spur gears are adapted to simultaneously swing the first swing arm and nut runner in an opposite direction to the second swing arm and nut runner about the radius along the seventh axis of translation.

According to another feature of the present invention, movement of the first swing arm and nut runner and the second swing arm and nut runner about the radius ranges from 0-180 degrees of rotation.

According to another feature of the present invention, the nut runners are driven by a servo motor to assist in fastening and loosening the component parts.

According to another feature of the present invention, the actuators are driven by a servo motor to assist in varying the length of the arms thereby moving and positioning the nut runners about a work area for fastening and loosening the component parts.

According to another feature of the present invention, a computer is adapted for controlling the robot.

DETAILED DESCRIPTION OF THE DRAWINGS

Figure 1:
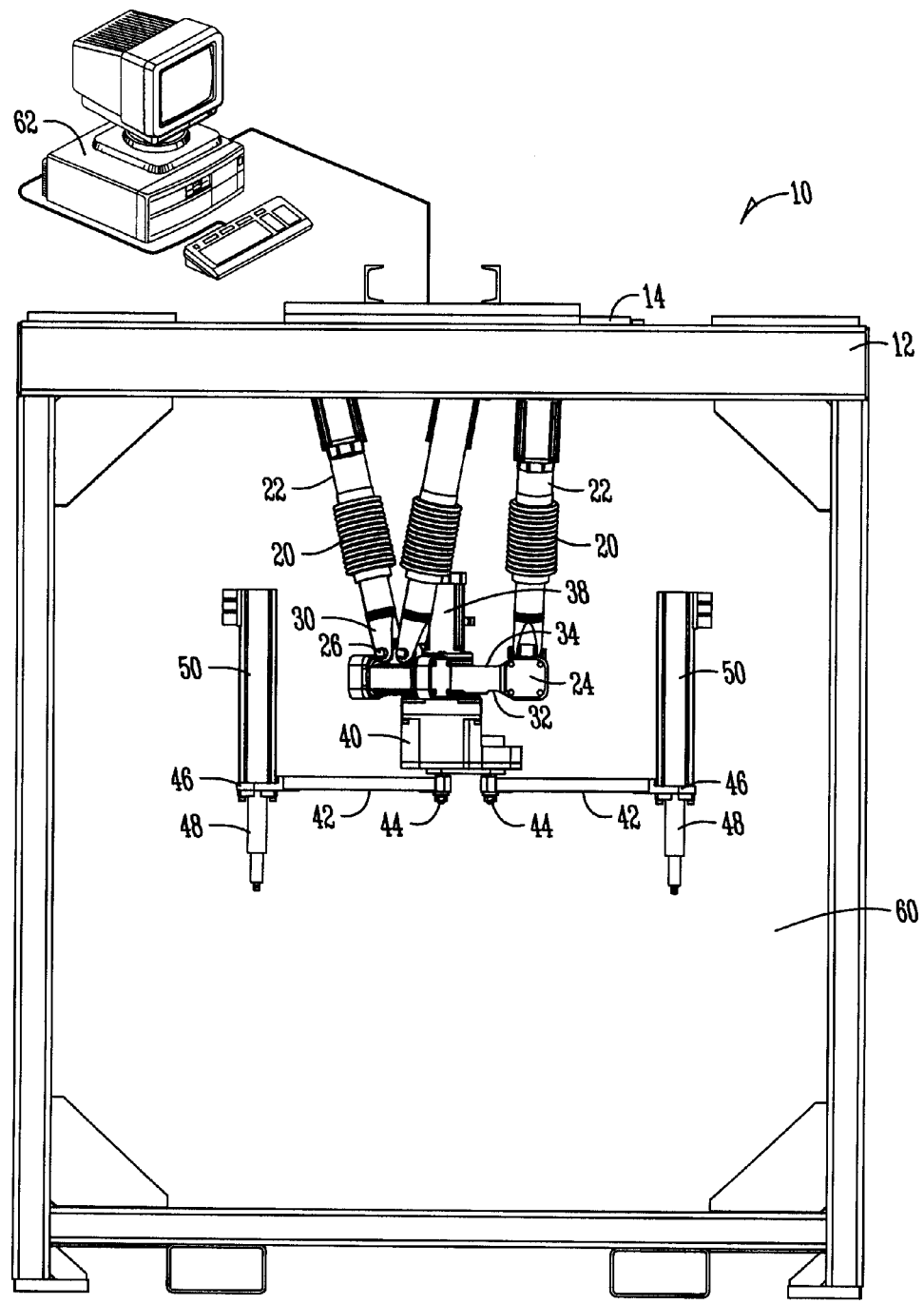
FIG. 1 is a front view of the robot and a supporting structure.
Figure 2:
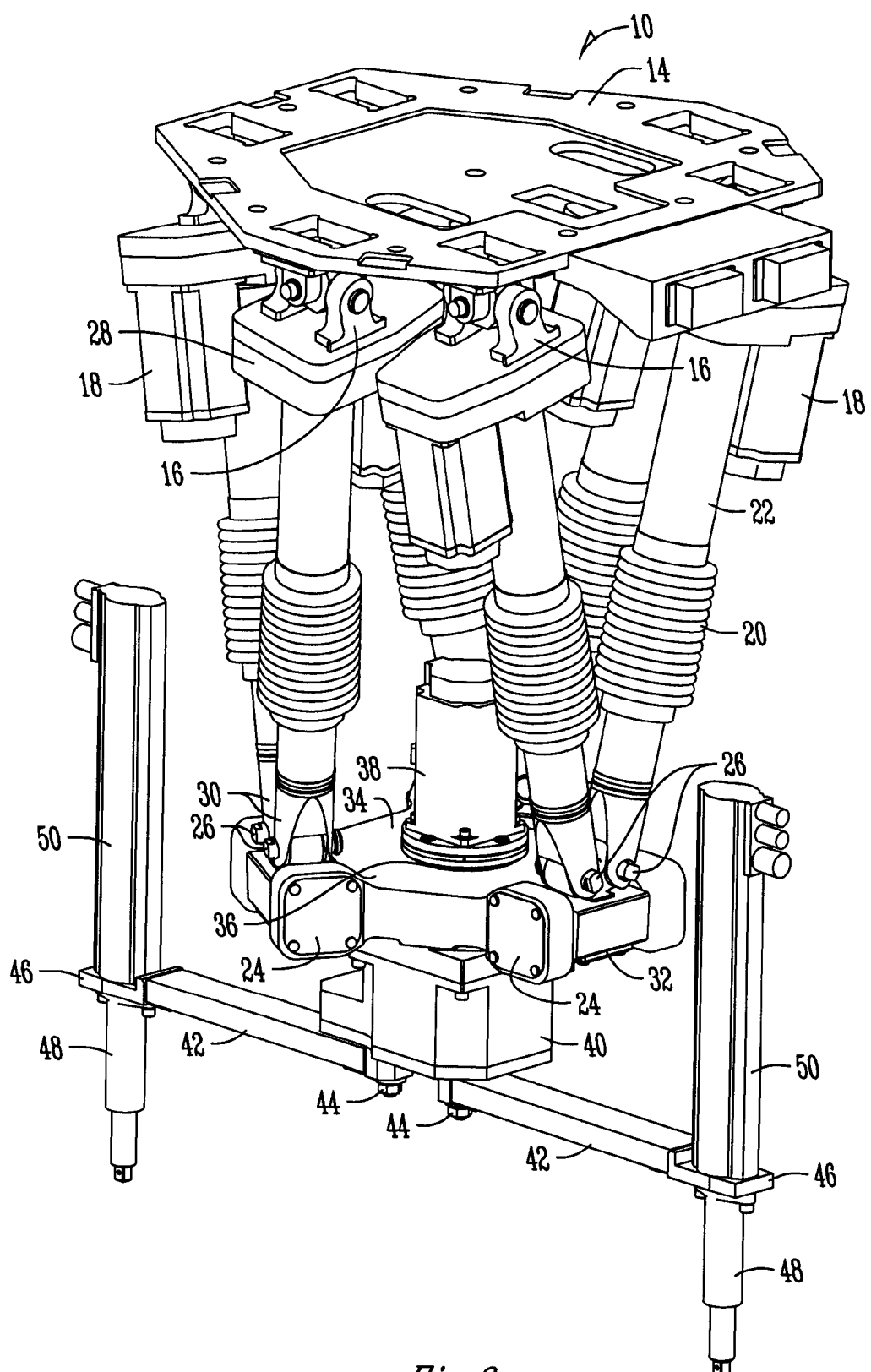
FIG. 2 is an isometric view of the robot.
Figure 3:
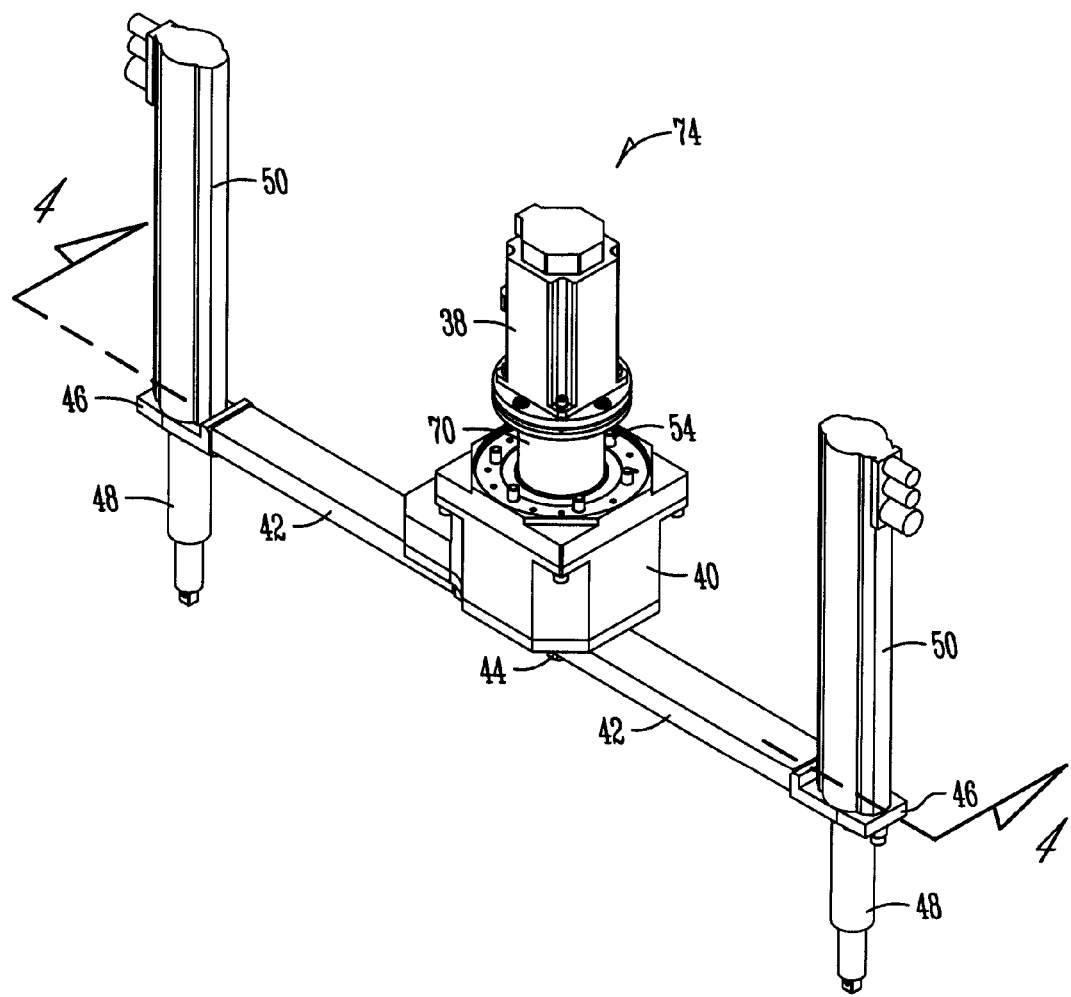
FIG. 3 is an isometric view of the seventh axis robot.
Figure 4:
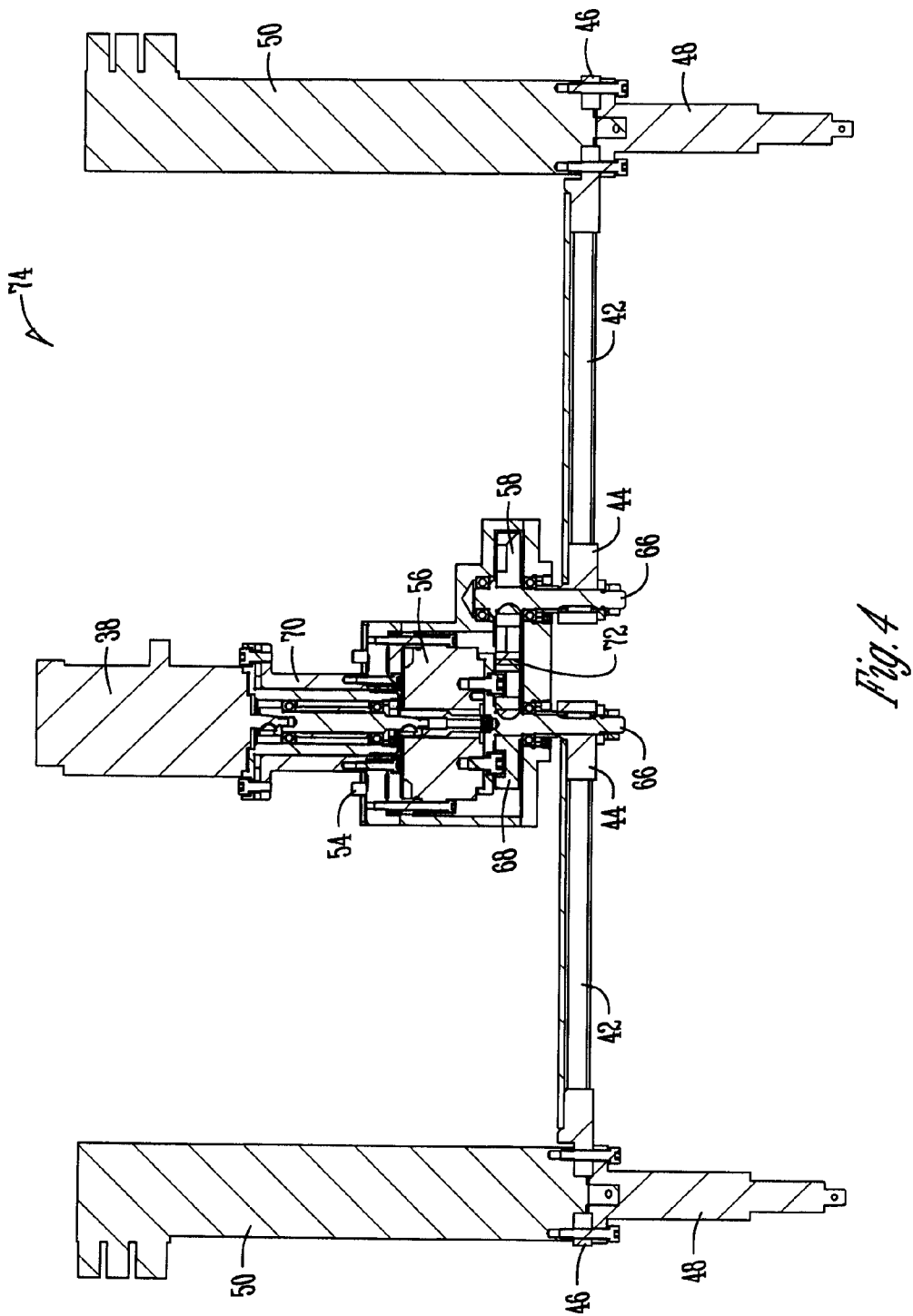
FIG. 4 is a cross sectional view of the seventh axis robot taken along line 4-4 in FIG. 3.
Figure 5A:
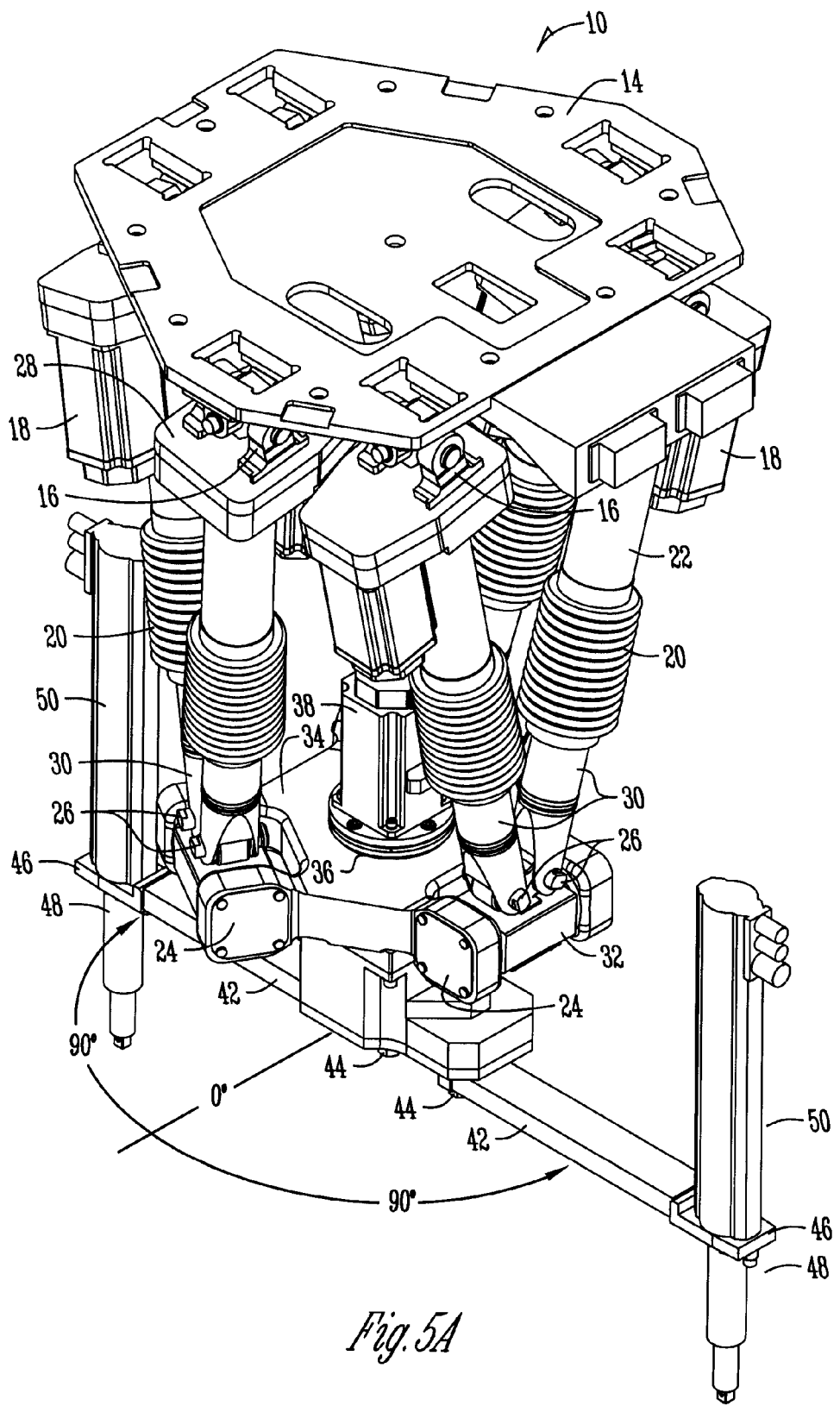
FIG. 5A is an isometric view of the robot swing arms rotated 90 degrees.
Figure 5B:
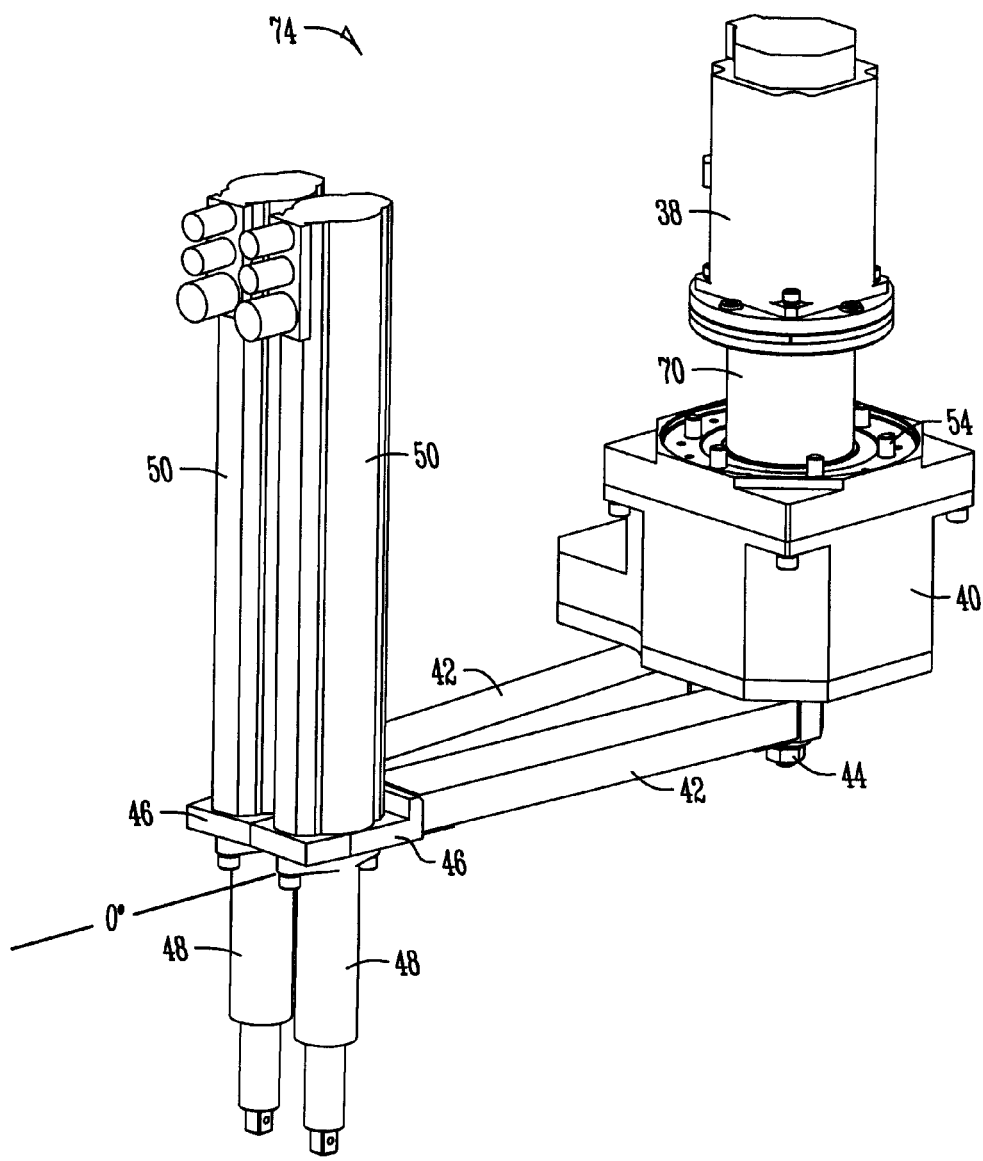
FIG. 5B is an isometric view of the robot swing arms rotated 0 degrees.
Figure 5C:
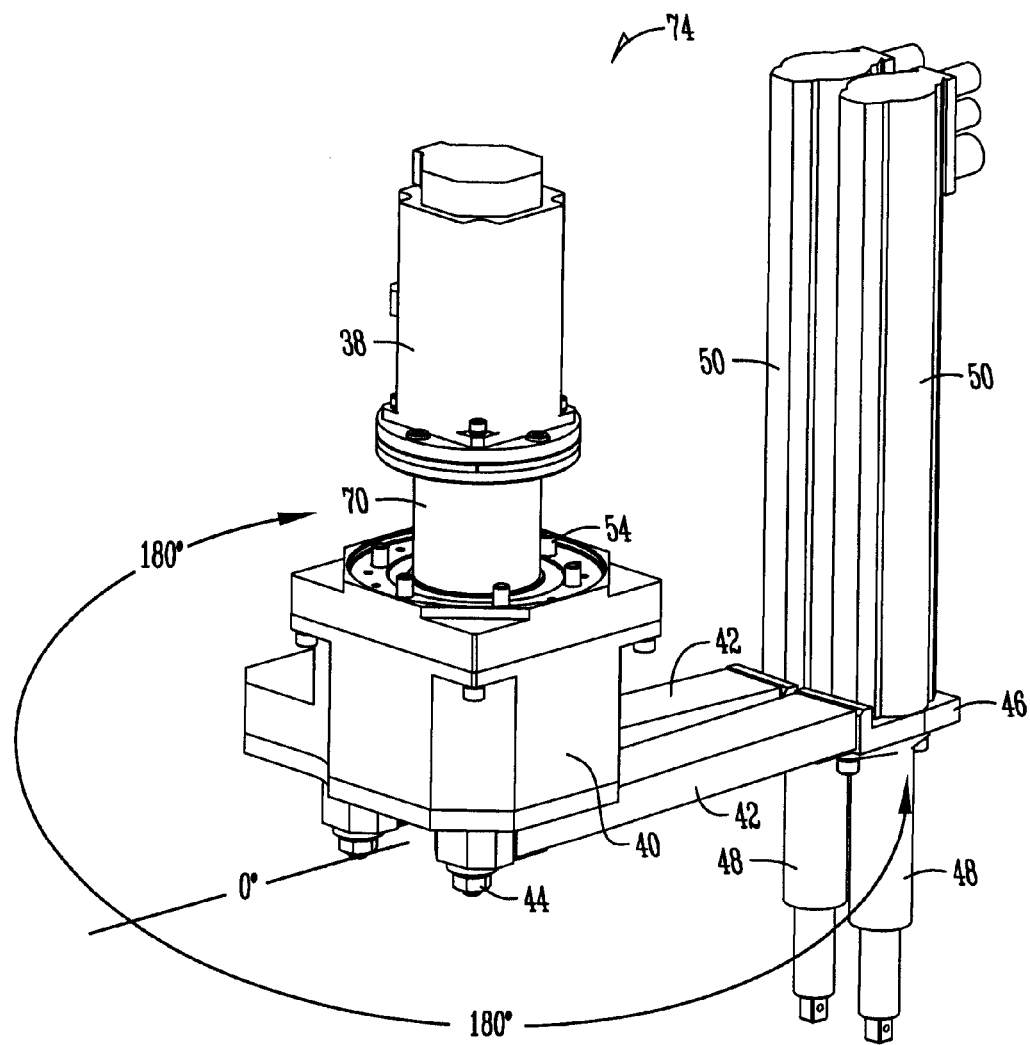
FIG. 5C is an isometric view of the robot swing arms rotated 180 degrees.

As seen in FIG. 1, the numeral 10 refers generally to the robot. The robot is secured to a supporting structure, such as a frame 12. Other supporting structures could include a floor, wall, ceiling or cross-member. The robot is attached to a mounting plate 14. The mounting plate 14 permits the robot to be mounted to a supporting structure, such as the frame 12. Best illustrated by FIG. 2, the mounting plate 14 includes joints 16 positioned about the mounting plate 14 for attaching the arms 22 of the robot 10 to the mounting plate 14. The joints 16 permit movement of each arm 22 about four axes. The arms 22 are defined by a first end 28 and a second end 30. The first end 28 of the arms 22 are attached to the joints 16. An actuator 20 is positioned within the arm 22 and between the first end 28 and the second end 30. A servo motor 18 is used to drive the actuator 20 so that the arm 22 may be shortened or lengthened. The second end 30 of the arms 22 is attached to a wrist 24. The wrist 24 has a bottom side 32, a top side 34 and an aperture 36 centered thereon. The second end 30 of the arms 22 is attached to the wrist 24 at paired connection points 26 located on the top side 34 of the wrist 24. The attachment of the first end 28 of the arms 22 to the mounting plate 14 using joints 16 in addition to the second end 30 of the arms 22 being attached to the wrist 24 using paired connections points 26 allows the wrist 24 to be translated about six axes of movement by lengthening or shortening the arms 22. A computer 62 controls movement of the servo motors 18 for driving the actuator 20 thereby lengthening and shortening the arms 22. The computer 62 is adapted to control the position of the wrist 24 by shuttling the wrist 24 to the desired position within the work area 60. As best shown in FIG. 3, the seventh axis robot 74 includes a servo motor 38 connected to a gear box 40 is secured to the wrist 24. The servo motor 38 is mounted on the top side 34 of the wrist 24. The servo motor 38 is preferably operated by the computer 62. The gear box 40 is mounted on the bottom side 32 of the wrist 24. The servo motor 38 is attached to a drive shaft casing 70 that passes down through the aperture 36 in the wrist 24. The drive shaft casing 70 is connected to the gear box 40. The gear box 40 is secured to the wrist 24 and prevented from rotating with the wrist 24 using pins 54. The gear box 40 uses a harmonic drive 56 for rotating the first spur gear 68, as shown in FIG. 4. The harmonic drive 56 provides minimal backlash, accurate positioning and a mechanical advantage for driving the first spur gear 68. The first spur gear 68 engages the second spur gear 58 at the gear meshing point 72. Rotating the first spur gear 68 causes an equal and opposite rotation of the second spur gear 58. A shaft 66 is connected to the first spur gear 68 and the second spur gear 58 for causing an equal and opposite rotation in the shafts 66. Swing arms 42 have a first end 44 and a second end 46. The first end 44 of the swing arms 42 are attached to shafts 66. The shafts 66 form a center of rotation for the swing arms 42. Nut runners 48 are connected to the second end 46 of the swing arms 42. The nut runners 48 consist of a servo motor 50 attached to a nut driver 48. The servo motors 50 are preferably operated by the computer 62. Operation of the servo motor 38 using the computer 62 causes the swing arms 42 to rotate in an equal and opposite direction, so when both arms 42 have swung 90°, as shown in FIG. 5A, such that the arms 42 form a straight line. The swing arms 42 are capable of rotating from 0° to 180°. The swing arms 42 are in a parallel position to each other at 0° (FIG. 5B) and 180° (FIG. 5C) of rotation. Actuation of the servo motor 38 causes the swing arms 42 to rotate in equal and opposite directions about a radius of 0-180°. Thus, by lengthening and shortening the arms 22 and rotating the swing arms 42, the robot 10 using the nut runners 50 is capable of tightening and loosening component parts of a work product about seven different axes of translation. This is possible because the arms 22 provide six degrees of freedom and the swing arms 42 provide an additional seventh degree of freedom. Because the nut runners 48 are adjustable about seven axes of translation they offer flexibility beyond traditional gang head positioning or group mounting of nut runners. These traditional mounting styles typically focused on one model style and did not allow easy adjustment for variations in the model and/or fastening locations. Being able to position a nut runner about seven axes of translation permits seamless adaptation to various models and fastening locations. Other traditional systems use a single nut runner mounted to a robot arm for fastening component parts. The present system, by offering nut runners positioned on swing arms and positionable about seven different axes, nearly doubles the throughput of a single nut runner mounted on the arm of a robot.

What is claimed is:

1. A robot for fastening component parts, the robot being associated with a frame, the robot comprising:
    a plurality of arms having a first end and a second end, the first end being operatively supported by the frame;
    an actuator being mounted between the first and the second end for varying the length of the arms;
    a wrist having a top side, a bottom side and an aperture centered thereon, the top side of the wrist further comprising a plurality of paired connection points;
    a pair of the second ends of the plurality of arms being operatively secured to each of the connection points on the top side of the wrist such that varying the length of the arms provides movement of the wrist about six axes of translation;
    a servo motor mounted on the top of the wrist and in driving communication downward through the aperture in the wrist;
    a gear box being mounted on the bottom side of the wrist and secured to the servo motor through the aperture in the wrist, the servo motor being adapted for driving the gear box;
    a pair of swing arms having a first end and a second end, the first end being attached to the gear box; and
    a nut runner being operatively attached to the second end of the swing arms, the servo motor driving the gear box thereby moving the swing arms and attached nut runners about a radius, the rotation of the swing arms about the radius and varying the length of the arms thereby providing movement of the nut runners about a seventh axis of translation.

2. The robot of claim 1 wherein the gear box further comprises a harmonic drive having a pair of spur gears, the spur gears being adapted to simultaneously swing the first swing arm and nut runner in an opposite direction to the second swing arm and nut runner about the radius along the seventh axis of translation.

3. The robot of claim 1 wherein movement of the first swing arm and nut runner and the second swing arm and nut runner about the radius ranges from 0-180 degrees of rotation.

4. The robot of claim 1 wherein the nut runners comprise a nut driver attached to and driven by a nut runner servo motor to assist in fastening and loosening component parts with the nut driver.

5. The robot of claim 1 wherein the actuators are driven by an actuator servo motor to assist in varying the length of the arms thereby moving and positioning the nut runners about a work area for fastening and loosening component parts.

6. The robot of claim 1 further comprising a computer adapted for controlling the robot.

7. A robot for fastening component parts, the robot being associated with a frame, the robot comprising:
    a motor in driving communication with a gear box;
    a plurality of linearly extensible arms having first ends supported by the frame and second ends attached to a wrist holding the motor for articulating the motor and gear box about a plurality of axes;
    a pair of swinging arms attached to and articulated about a radius by the gear box;
    a nut runner secured to each swinging arm wherein the gear box further comprises a harmonic drive adapted to assist in movement and positioning of the nut runners, the harmonic drive adapted to drive a pair of spur gears, the pair of spur gears being adapted to simultaneously swing the first swinging arm and nut runner in an opposite direction to the second swinging arm and nut runner about the radius.

8. The robot of claim 7 wherein each linearly extensible arm comprises an actuator driven by a servo motor for moving the plurality of arms between a longitudinally extended or contracted position.

9. The robot of claim 8 wherein the plurality of axes are defined by movement of the wrist about six axes of translation.

10. The robot of claim 9 wherein movement of the nut runners by the motor about the radius defines a seventh axis of translation.

11. The robot of claim 10 wherein movement of the first swinging arm and nut runner and the second swinging arm and nut runner about the radius ranges from at least 0-180 degrees of rotation.

12. The robot of claim 11 wherein the motor comprises a servo driven motor to thereby assist in movement and positioning of the nut runners.

13. The robot of claim 12 wherein each nut runner is driven by a nut runner servo motor to assist in fastening and loosening component parts.

14. A robot for fastening component parts, the robot being associated with a frame, the robot comprising:
- a plurality of linearly extensible arms suspended from the frame by first ends;
- a wrist operatively attached to second ends of the plurality of linearly extensible arms;
- a first servo motor secured to the wrist;
- a gear box attached to the first servo motor supported by the wrist;
- a pair of shafts extending from the gear box and supporting a pair of swing arms, the pair of swing arms rotatable by the pair of shafts about a radius in opposite directions to each other; and
- a nut runner operatively attached to each swing arms for fastening and loosening component parts.

15. The robot of claim 14 wherein an actuator being driven by a second servo motor moves the plurality of linearly extensible arms between a longitudinally extended or contracted position to assist in movement and positioning of the nut runners.

16. The robot of 15 wherein the nut runners are driven by a third servo motor to assist in fastening and loosening component parts.

17. The robot of claim 16 further comprising a computer adapted for driving each servo motor and controlling movement of the plurality of linearly extensible arms and the pair of swing arms.

18. The robot of claim 14 wherein the plurality of linearly extensible arms provide movement of the nut runners about six axes, the first servo motor providing movement of the nut runners about a seventh axis.

19. The robot of claim 14 wherein the gear box further comprises a harmonic drive having a pair of spur gears driving said pair of shafts, the spur gears being adapted to simultaneously swing the first swing arm and nut runner in an opposite direction to the second swing arm and nut runner about the radius.

* * * * *